(12) United States Patent
Kroczek et al.

(10) Patent No.: US 11,873,910 B2
(45) Date of Patent: Jan. 16, 2024

(54) BALL VALVE ASSEMBLY

(71) Applicant: Goodrich Corporation, Charlotte, NC (US)

(72) Inventors: Piotr Kroczek, Dolnośląskie (PL); Dariusz Sapija, Kiełczówek (PL); Agata Kurowska-Kalińska, Kowale (PL); Martin Lei, Canal Fulton, OH (US); Grzegorz Kruczek, Gliwice (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/826,709

(22) Filed: May 27, 2022

(65) Prior Publication Data
US 2022/0381353 A1  Dec. 1, 2022

(30) Foreign Application Priority Data
May 31, 2021  (EP) ..................................... 21461549

(51) Int. Cl.
*F16K 11/087* (2006.01)
*F16K 31/04* (2006.01)
*F16K 31/524* (2006.01)

(52) U.S. Cl.
CPC .......... *F16K 11/087* (2013.01); *F16K 31/042* (2013.01); *F16K 31/046* (2013.01); *F16K 31/52466* (2013.01)

(58) Field of Classification Search
CPC .... F16K 31/042; F16K 31/046; F16K 11/087; F16K 31/52–5288; F15B 2013/0409–0414; F15B 15/28–2892; F15B 2211/31–3144; F15B 2211/41–413; F15B 2211/51–513;
(Continued)

(56) References Cited

U.S. PATENT DOCUMENTS 1,903,229 A * 3/1933 Stewart ................. F16K 31/046
251/80
1,903,230 A * 3/1933 Stewart ................. F16K 31/046
251/129.13
(Continued)

FOREIGN PATENT DOCUMENTS

CN          2580236 Y      10/2003
CN        101994847 A       3/2011
(Continued)

OTHER PUBLICATIONS

Machine translation of CN101994847A (taken from Search database @ USPTO onDec. 30, 2022) (Year: 2022).*
(Continued)

Primary Examiner — Craig J Price
(74) Attorney, Agent, or Firm — CANTOR COLBURN LLP

(57) ABSTRACT

A ball valve assembly includes a ball element arranged to be rotated by rotation of a shaft in engagement with the ball element, the ball element having first and second flow channels defined therethrough, a first inlet port at a first end of said first flow channel, a first outlet port at a second end of the first channel, a second inlet port at a first end of the second flow channel and a second outlet port at a second end of the second channel.

8 Claims, 13 Drawing Sheets

(58) Field of Classification Search
CPC ....... F15B 2211/765–7656; E03F 7/10; G01N 30/24; Y10T 137/87064; Y10T 137/87161
USPC ........... 137/551–559; 251/129.03; 200/51 R; 318/2, 674, 374
See application file for complete search history.

(56) References Cited

U.S. PATENT DOCUMENTS

| | | | | |
|---|---|---|---|---|
| 2,523,825 | A | * | 9/1950 | Hartley ................ F16K 31/055 200/51 R |
| 3,370,612 | A | | 2/1968 | Holl |
| 3,862,739 | A | * | 1/1975 | Fujiwara .............. F16K 31/041 251/129.03 |
| 4,139,355 | A | | 2/1979 | Turner et al. |
| 4,964,436 | A | | 10/1990 | Hein |
| 5,285,809 | A | | 2/1994 | Shimoguri |
| 6,267,139 | B1 | * | 7/2001 | Miklo .................... F16K 27/02 137/554 |
| 7,163,192 | B2 | * | 1/2007 | Aoki .................... F16K 31/045 251/248 |
| 2001/0035510 | A1 | * | 11/2001 | Oh ...................... F16K 37/0041 251/129.03 |
| 2021/0080011 | A1 | | 3/2021 | McMenamy |
| 2021/0315106 | A1 | * | 10/2021 | Kurowska ................ H05K 1/18 |

FOREIGN PATENT DOCUMENTS

| | | | | |
|---|---|---|---|---|
| CN | 102305305 | A | | 1/2012 |
| CN | 106286902 | A * | 1/2017 | .......... F16K 11/0873 |
| CN | 109138143 | A | | 4/2019 |
| DE | 102009051324 | A1 | | 6/2011 |

OTHER PUBLICATIONS

Machine translation of CN109138143A (taken from Search database @ USPTO onDec. 30, 2022) (Year: 2022).*
Abstract for CN2580236 (Y), Published: Oct. 15, 2003, 1 page.
Abstract for CN101994847 (A), Published: Mar. 30, 2011, 1 page.
Abstract for CN109138143 (A), Published: Jan. 4, 2019, 1 page.
Abstract for DE102009051324 (A1), Published: Jun. 9, 2011, 1 page.
Abstract of CN102305305 (A), Published: Jan. 4, 2012, 1 page.
European Search Report for Application No. 21461549.4, dated Nov. 25, 2021, 10 pages.

* cited by examiner

POSITION 1

POSITION 2

POSITION BETWEEN

EXPLANATION TO SITUATION FROM TABLE

EXPLANATION TO SITUATION WITH DAMAGED SENSORS - VALVE SHOULD NOT WORK

EXPLANATION TO SITUATION WITH DAMAGED SENSORS - VALVE SHOULD NOT WORK

BALL VALVE ASSEMBLY

CROSS-REFERENCE TO RELATED APPLICATIONS

This application claims priority to European Patent Application No. 21461549.4 filed May 31, 2021, the entire contents of which is incorporated herein by reference.

TECHNICAL FIELD

The present disclosure relates to ball valves for controlling fluid flow such as for water systems.

BACKGROUND

Valves are used in many applications to control the flow of fluid. Valves can be used to stop fluid flow or to reduce/increase and/or divert fluid flow. Valves can be manually operated and/or automatically operated e.g. motorised. For example, a valve may be provided between a source of fluid e.g. water and a reservoir such as a water tank e.g. for use in a water closet, a wash basin, a drinks machine etc. The valve can be opened to fill the reservoir from the source and then closed when the reservoir is sufficiently full. One type of valve is a ball valve or ball shaft wherein a rotatable ball element is mounted within a conduit providing the fluid flow path. The ball element has a passage or channel therethrough. The ball is mounted on a shaft that is rotated, in the case of manual operation, by means of a handle attached to the shaft or, in the case of a motor driven valve, by means of a motor. Rotation of the shaft causes rotation of the ball element and thus the channel relative to the flow path through the conduit. Thus, the valve is rotated, either manually by means of a handle or automatically, by means of a motor, between an open position in which the channel through the ball is aligned with the flow path to allow flow of fluid through the passage, and a closed position in which the passage is not aligned with the flow path and, instead, the body of the ball element closes off the flow path and fluid is unable to flow past the ball element.

In some cases, the reservoir is provided with an overfill prevention feature to avoid the reservoir becoming overfull. The overfill directs fluid out of the reservoir if the fluid exceeds a certain level in the reservoir. Conventionally an overfill valve may be provided at an overfill line which, when opened, allows fluid to flow out of the reservoir. One overfill solution uses an overfill line in one valve. This involves a relatively large hydraulic body having one side located in the fill line and the other side located in the overfill line. Such valves, however, have a large size and mass and are sensitive to vibrations. These are not, therefore, useful in high vibration environments such as aircraft.

Conventional systems require two separate valves for the fill flow path and the overfill line or flow path as shown in FIG. 1.

In some applications, it is desirable to minimise the overall weight, size and or number of parts in a system. This is the case, for example, in water systems in aircraft where weight and size should be kept to a minimum. This is particularly important in small aircraft, e.g. small business jets.

There is, therefore a need for a simple, low cost, small and low weight valve assembly that can provide fill and overfill functions.

SUMMARY

According to one aspect, there is provided a ball valve assembly comprising a ball element arranged to be rotated by rotation of a shaft in engagement with the ball element, the ball element having first and second flow channels defined therethrough, a first inlet port at a first end of said first flow channel, a first outlet port at a second end of the first channel, a second inlet port at a first end of the second flow channel and a second outlet port at a second end of the second channel.

Each of the first and the second channels may define a bend within the ball element, wherein the first inlet port, the second inlet port, the first outlet port and the second outlet port are substantially evenly spaced around the ball element.

The ball element may be driven by a cam shaft having a cammed external profile, the assembly further comprising switch means arranged to cooperate with the cam shaft to provide an indication of the rotational position of the cam shaft. The switch means may comprise a plurality of microswitches arranged around and in proximity to the external profile of the cam shaft such that the external profile contacts and activates said switches at predetermined rotational positions of the shaft. The microswitches may be arranged to switch in response to rotation of the cam shaft by 45 degrees.

In one example, the switch means comprises two sets of microswitches, each set of microswitches comprising two microswitches arranged substantially 180 degrees apart around the circumference of the shaft, wherein the sets of microswitches are separated axially from each other with respect to the axis of the cam shaft. The cammed external profile of the cam shaft may comprise a first set of recesses arranged to cooperate with a first of the sets of microswitches, and a second set of recesses spaced axially from the first set and arranged to cooperate with a second of the sets of microswitches.

In an example, the first and second channels have a cross-section that is substantially circular at the ends of the channels and is non-circular e.g. elliptical, between the ends within the ball element.

Also provided is a water system having a fill line and an overfill line, and a ball valve assembly as defined above located in the fill line and the overfill line such that, in a first rotational position of the shaft and the ball element, the first channel is aligned with and provides fluid flow along the fill line and the second channel is aligned with and provides fluid flow along the overfill line, and in a second rotational position of the shaft and the ball element flow is interrupted along the fill line. Preferably, the second rotational position is a 45 degree rotation relative to the first rotational position and, in the second rotational position neither the first channel nor the second channel is aligned with either of the fill line and the overfill line and now flow is enabled through the first or the second flow channel.

Also provided is method of operating a ball valve assembly as defined above, comprising rotating the shaft to rotate the ball element to a first position to align the first flow channel with a fluid fill line to allow fluid to flow along the fill line via the first flow channel and to align the second flow channel with an overfill line to allow fluid to flow along the overfill line via the second channel, and rotating the shaft by a quarter turn so that the first and second flow channels are not aligned with the fill and/or overfill lines and fluid flow is prevented through the flow channels.

BRIEF DESCRIPTION OF THE DRAWINGS

Preferred embodiments will now be described, by way of example only, with reference to the drawings. In the examples, reference is made to a water system e.g. in an aircraft, but the scope of the disclosure is not limited thereto and the valve assembly of this disclosure may find use in other applications where fluid flow is to be controlled or regulated.

DETAILED DESCRIPTION

According to the disclosure, a valve assembly is provided in which a single ball shaft provides both fill and overfill functions.

Figure 2A:
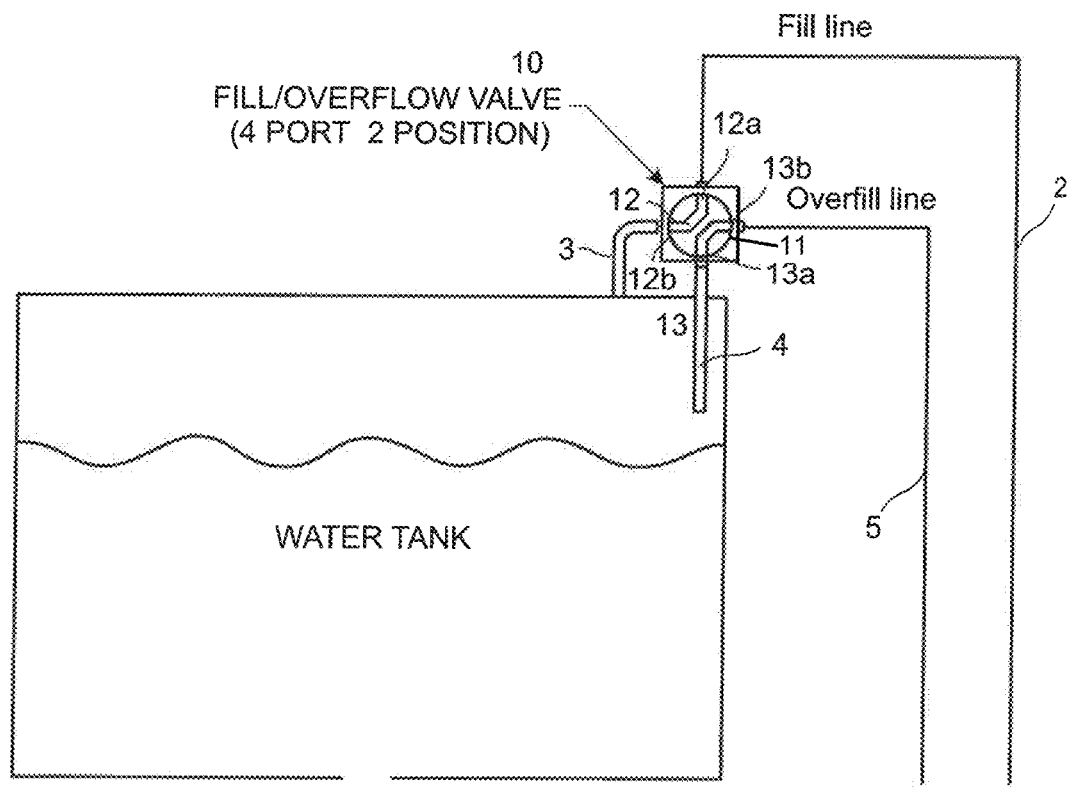
FIG. 2A is a schematic view showing an example of a valve assembly, in a first position, according to one example of the disclosure.
Figure 2B:
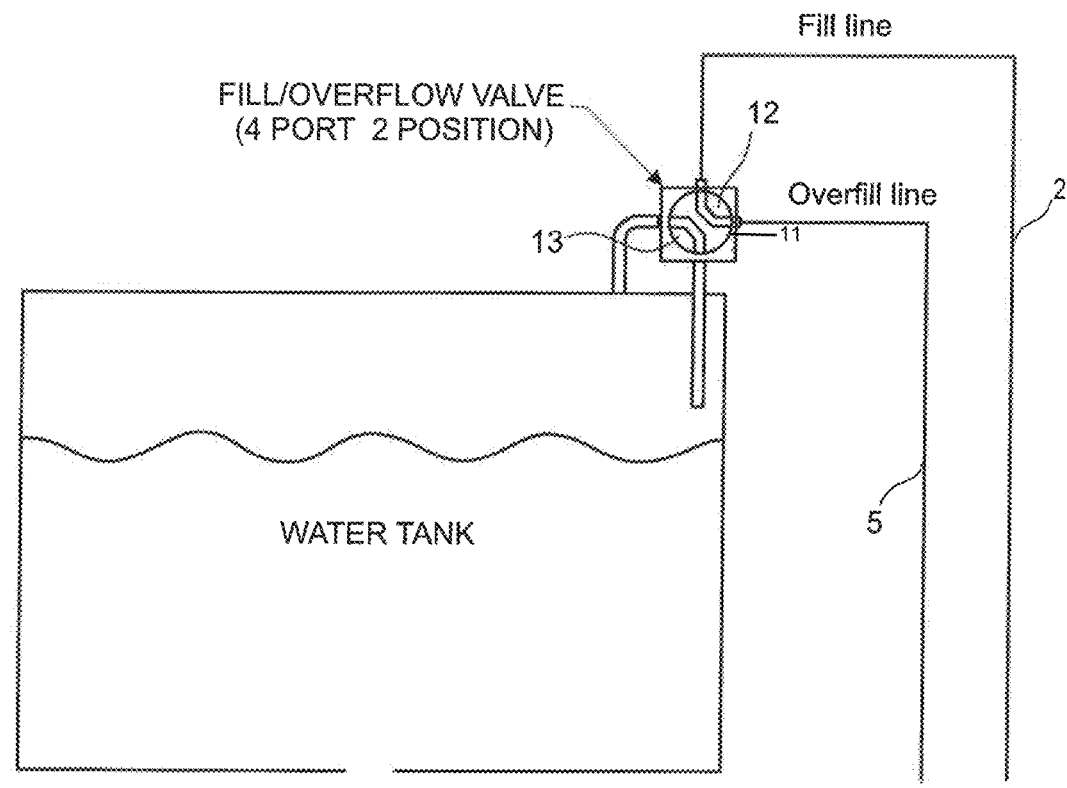
FIG. 2B is a schematic view of the valve assembly of FIG. 2A in a second position.
Figure 3:
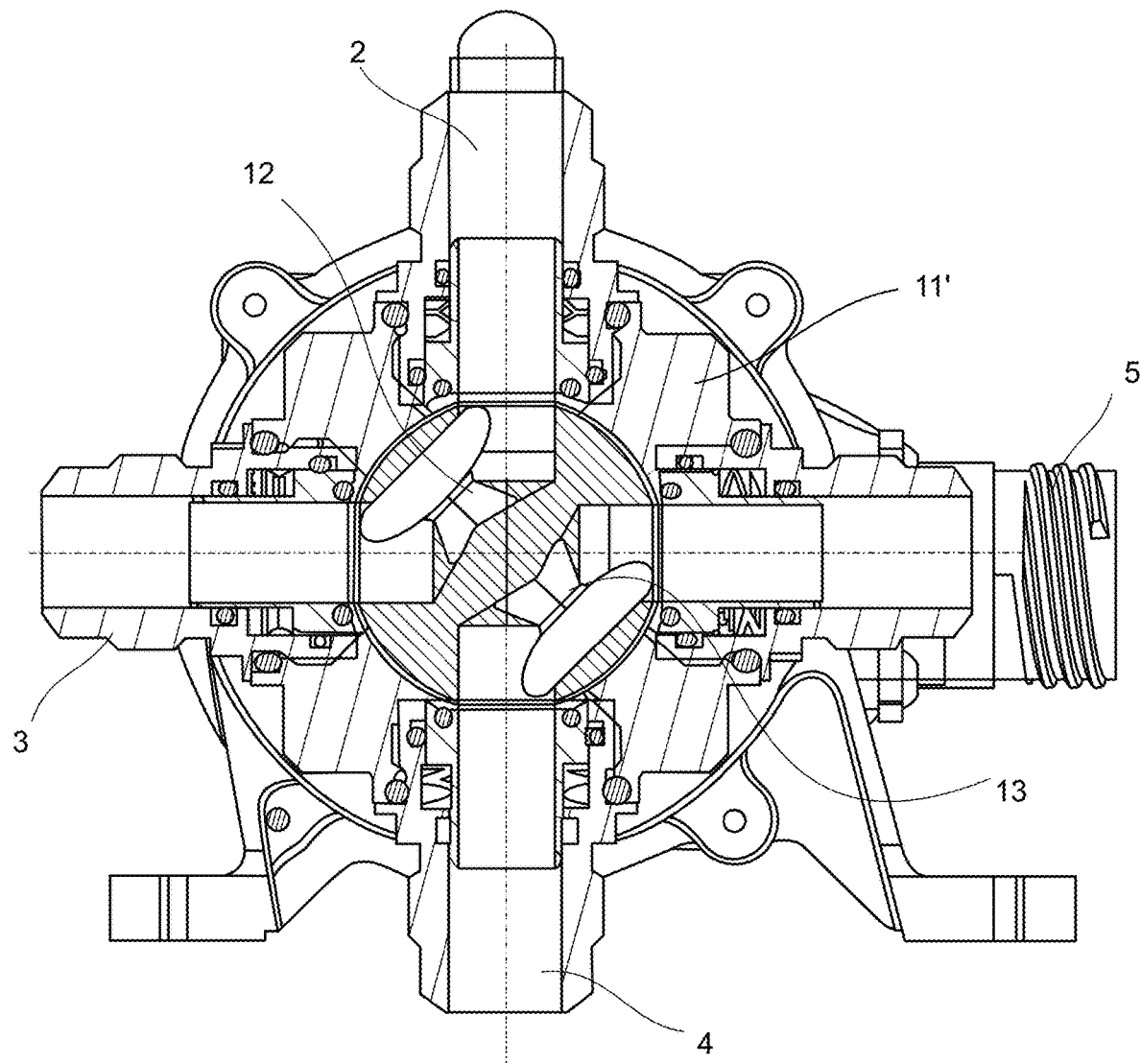
FIG. 3 shows a view of a valve assembly according to a second example of the disclosure in a first position.
Figure 4:
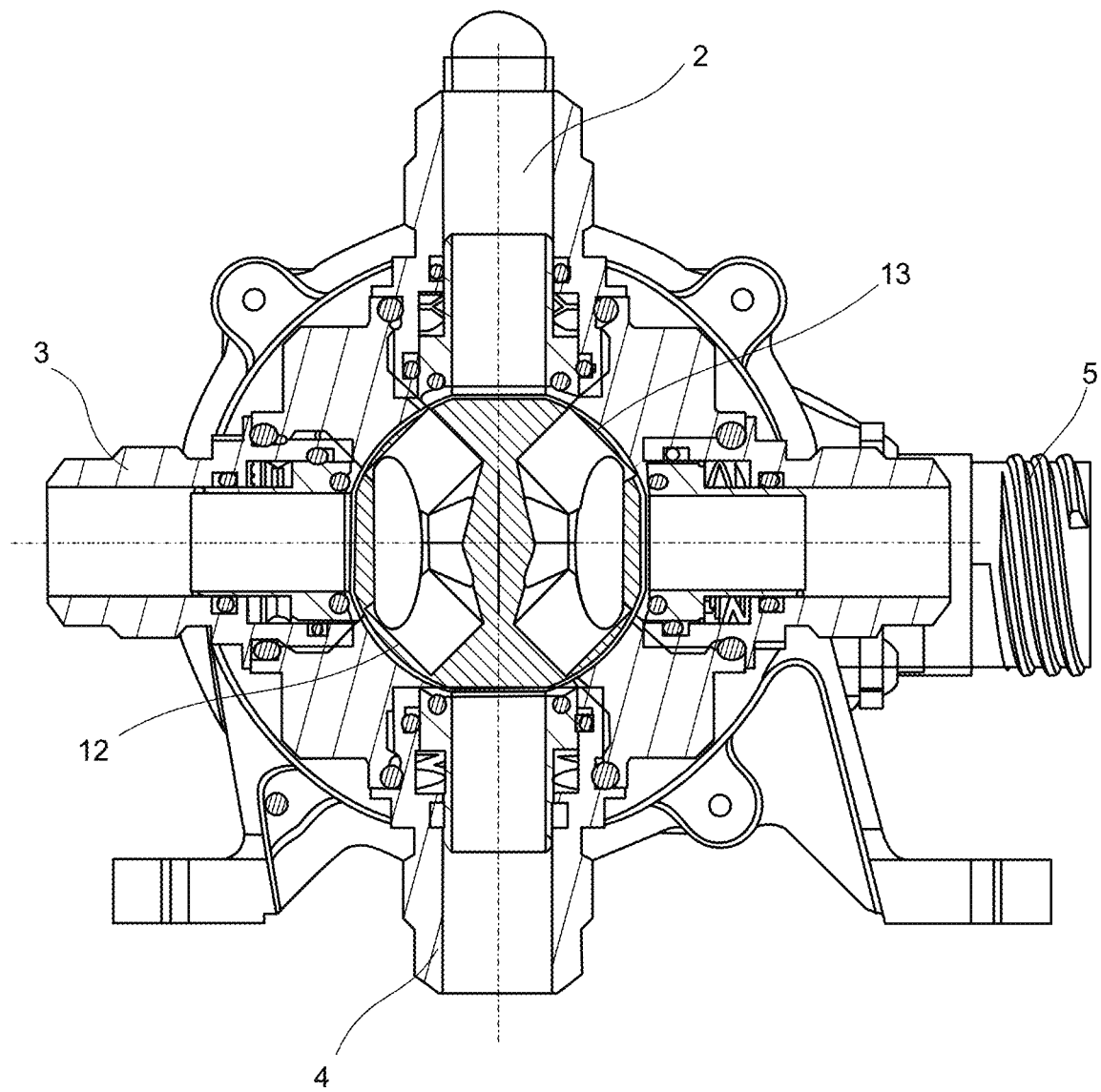
FIG. 4 shows a view of the valve assembly of FIG. 3 in a second position.

FIGS. 2A and 2B show a first example of the assembly.

FIG. 2A shows a tank or reservoir 1 to be filled from a supply (not shown) via a fill line 2 and an inlet 3. An overflow function is provided by an outlet 4 and an overfill line 5. The outlet 4 extends into the tank 1 to a depth above which the tank 1 would be considered over-full if the fluid in the tank reached that level. Should the fluid level in the tank 1 be higher than the depth to which the outlet 3 extends, fluid is drained from the tank via the overfill line 5 and is, for example expelled from the system as waste. In an aircraft, the drained fluid may be dumped overboard.

According to a first example, the disclosure has a single valve 10 common to both the fill line and the overfill line. The valve 10 is a ball shaft comprising a rotatable ball element 11 which is rotatable relative to the fill line and the overfill line to open or close the fluid flow path from the fill line to the inlet as described further below. Rotation of the ball element 11 is by means of rotation of a shaft 110

The ball element 11 of this example is provided with two channels 12, 13 therethrough. A first channel 12 is defined between a first 12a and a second port 12b in the ball element. A second channel 13 is defined between a third 13a and a fourth 13b port in the ball element. The first and second ports are spaced approximately 90 degrees apart around the ball circumference and the first channel therefore has an approximately 90 degree bend. Similarly, the third and fourth ports are spaced approximately 90 degrees apart and the second channel also therefore has an approximately 90 degree bend inside the ball element 11. The ball element therefore has four ports approximately equally spaced around the ball element, and two channels 12, 13.

FIG. 2A shows the valve assembly with the ball element in a first, fill position. Water (in this example, although this may of course be another fluid) is provided from the supply (not shown) along the fill line 2. In the first position, the first port 12a is aligned with the fill line 2 and the second port 12b is aligned with the inlet. The fluid enters the first channel 12 via the first port 12a and exits the ball element 11 via the second port 12b to enter the tank 1 via the inlet 3 which is aligned with the second port 12b. In this position, the third port 13a is aligned with the overfill line 5 and the fourth port 13b is aligned with the outlet 4. Should the water level in the tank 1 exceed the depth of the outlet 4 extending into the tank 1, overflow water will be drained via the outlet 4, into the ball element via the third port 13a, along the second channel 13, through the fourth port 13b and out of the system via the overfill line 5.

Once the tank 1 has been filled via the fill line 2, the first channel 12 and the inlet 2, the inlet is closed by rotating the shaft 110 and, therefore, the ball element 11 by a quarter turn, i.e. 90 degrees such that, as shown in FIG. 2B, one of the first or second channels (depending on the direction of rotation and here the first channel 12) connects the fill line 2 and the overfill line 5 and the other channel (here the second channel 13) connects the inlet 2 and the outlet 4. Thus water cannot flow from the fill line into the tank.

With such ball valves, accurate rotational positioning of the ports and channels relative to the inlet and outlet is important. This is achieved by the shaft 110 being a cam shaft—i.e. having a shaped or cammed outer surface and by providing a switch arrangement adjacent the cam shaft. The switch arrangement comprises switches e.g. microswitches at known circumferential locations relative to the cam shaft. The cam is designed such that when the shaft is rotated to a certain position, the cam contacts a switch which closes a circuit, allowing current to flow to be sensed by an external system. The current flow indicates the rotational position of the shaft, and hence the ball element. The switches may be positioned, and the cam shaft formed, such that when the ball element has reached the closed position, the cam strikes a microswitch which then interrupts current to the control module which controls the motor, for a motor driven valve, thus stopping the motor and, therefore, stopping rotation of the shaft. In other embodiments, the cam striking a switch can cause the switch to close a circuit to allow current to flow either to drive a motor or to indicate a rotary position of the valve. This can even be useful in the case of a manual valve so that the user knows when the ball element has reached the desired position.

Figure 1:
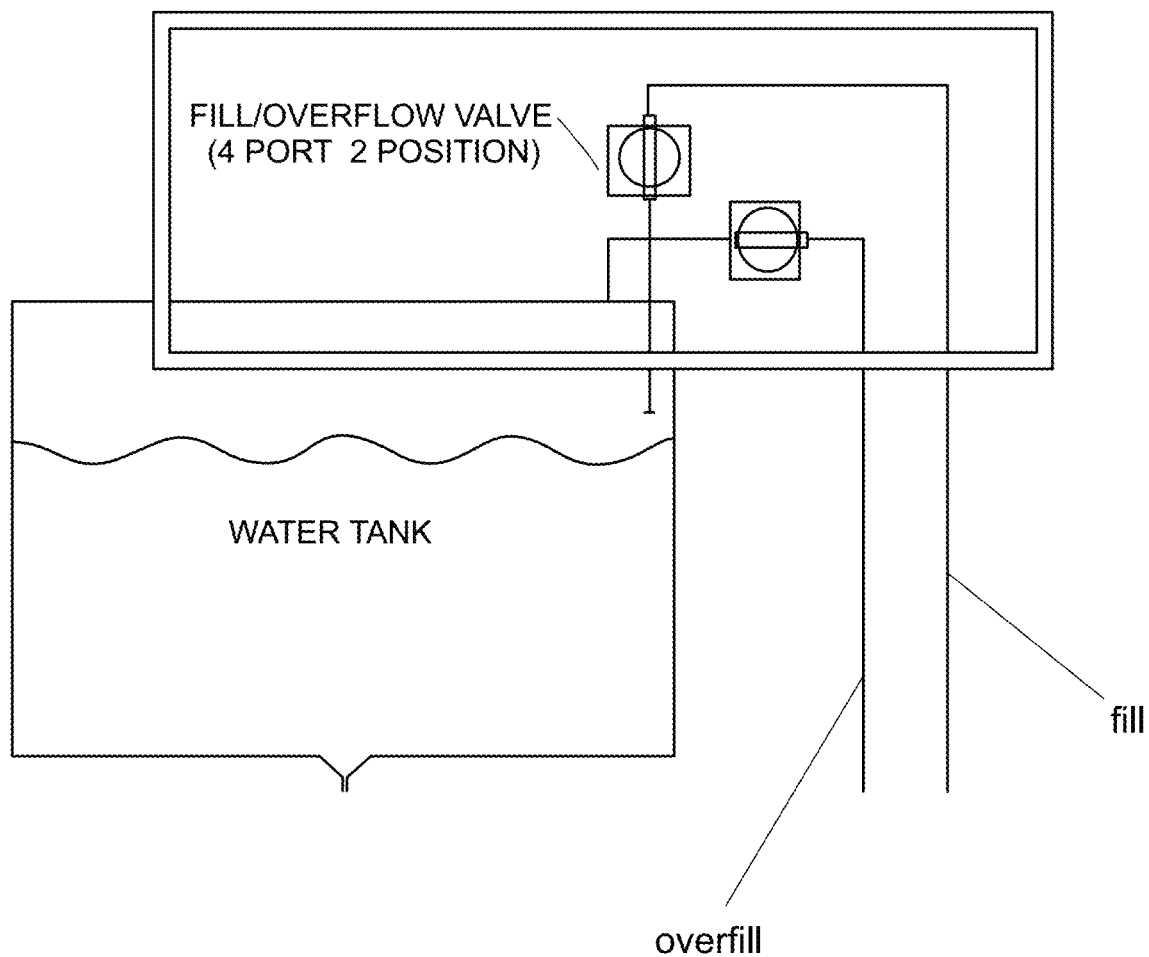
FIG. 1 shows a conventional arrangement having separate valves for the fill line and the overfill line.

In conventional ball valves, and in the example of FIGS. 1 and 2 of this disclosure, microswitches are positioned, and the cam designed, to detect open and closed positions of the ball element that are one quarter or one half turn apart. Usually, two microswitches are located 90 degrees apart.

Whilst this assembly is advantageous compared to conventional systems which use two separate valves for the fill line and the overfill line, one problem is that any water still flowing from the fill line flows directly to the overfill line and is drained from the system as waste water. This is an undesirable waste of clean water.

In a further, improved example, this problem is solved by designing the cam shaft 110 and the ball element 11' as described further with reference to FIGS. 3 to 8. It should be assumed, for ease of explanation, that the ball element 11' is located between the fill line, the inlet, the outlet and the overfill line as shown in FIGS. 1 and 2. The design of the positioning mechanism and also the channels in the ball element is, however, different in this second example to avoid wasting clean water and to maximise flow through the channels through the ball element.

In the improved design of this second embodiment, as well as having four ports and two channels in a single ball valve, the valve assembly is further modified so that the ball shaft and ball element are rotated only 45 degrees between the open and closed position. This will be described further below, but overcomes the problem of wasting clean water by draining to the overfill line when the valve is closed.

The valve assembly of this embodiment of the disclosure is similar in structure to that of the first example described above with reference to FIGS. 2A and 2B in that the ball element contains two channels therethrough each defined between two ports, such that the ball element has four equally spaced ports and the channels are each bent at an approx. 90 degree angle inside the ball element.

In the open position of the valve of this second example, the channels and ports are positioned relative to the fill line, the inlet, the overfill line and the outlet as is shown in FIG. 2A and as in the first example described above. This is also shown in more detail in FIG. 3. To close the valve, however, the shaft 110 and thus the ball element 11' are rotated only 45 degrees to the position shown in FIG. 4. The channels 12, 13 are then no longer aligned with the ports and the lines, inlet and outlet. Instead, the body of the ball element between the ports shuts off the flow paths from the fill line to the inlet and from the outlet to the overfill line. The valve is therefore completely closed.

One consideration in this embodiment is that the positioning mechanism needs to be able to detect a 45 degree rotation rather than a quarter turn. It is not practicable or desirable, however, to have to modify the position of the microswitches to detect this smaller degree of rotation. The valve of this disclosure should be able to be fitted into existing systems and as the positioning mechanism microswitches are already provided in such systems, having to modify their location would be undesirable complex and time intensive. Furthermore, it is undesirable to have microswitches positioned closer to each other than they already are (e.g. 90 degrees apart). Arranging the microswitches 45 degrees apart to detect a 45 degree turn cannot be achieved with the available envelope. Having switches at 45 degrees would require a bigger envelope, thus increasing the overall size and weight of the valve.

Figure 5:
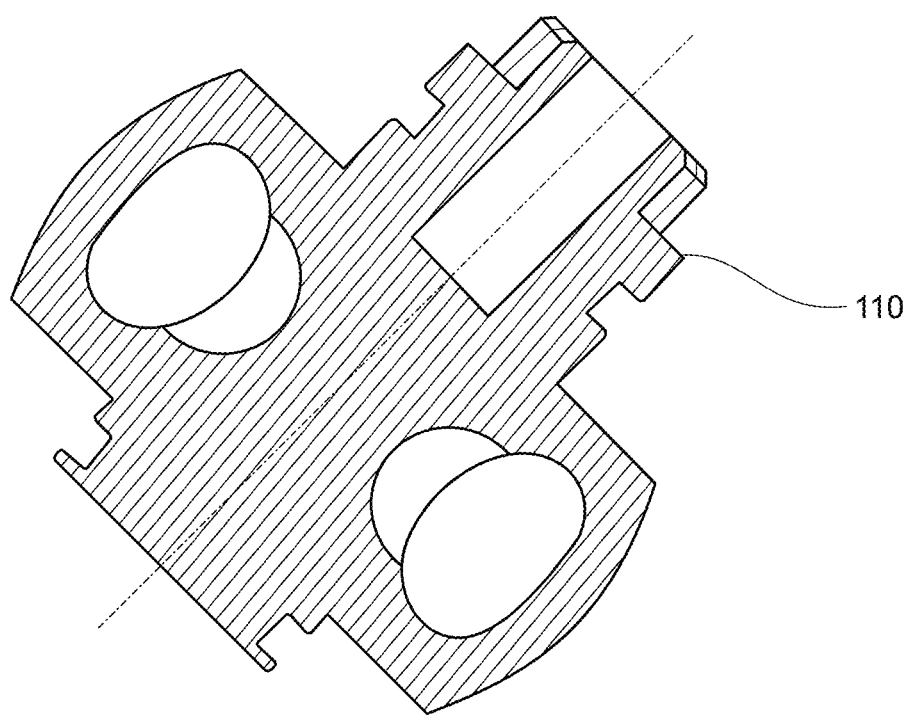
FIG. 5 is a sectional view of a valve assembly such as shown in FIGS. 3 and 4.
Figure 6B:
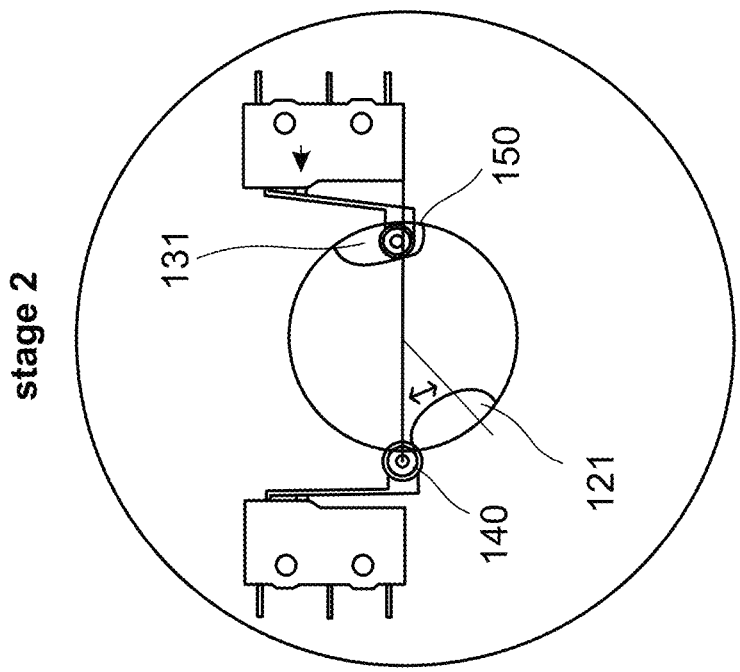
FIGS. 6A and 6B show operation of the valve assembly according to an example of the disclosure.

In order to achieve an accurate 45 degree positioning of the ball element, therefore, in the second example, the cam shaft is modified as will be described further with reference to FIGS. 5, 6A and 6B. FIG. 5 shows the cam shaft 110 to which the ball element 11' is attached. The cam shaft of this example is provided, on its circumference, with two undercuts 120, 130, rather than—as is conventional—a single undercut. In conventional designs, and also in the design of the first example of this disclosure, the cam shaft (not shown) has a single undercut that strikes against a first microswitch 140 when rotated to the closed position in one direction and that strikes against a second microswitch 150, spaced 180 degrees from the first microswitch 140 when rotated to the closed position in the second direction. The improved design of the cam shaft 110 for the second example provides actuation on rotation of only 45 degrees.

Figure 6A:
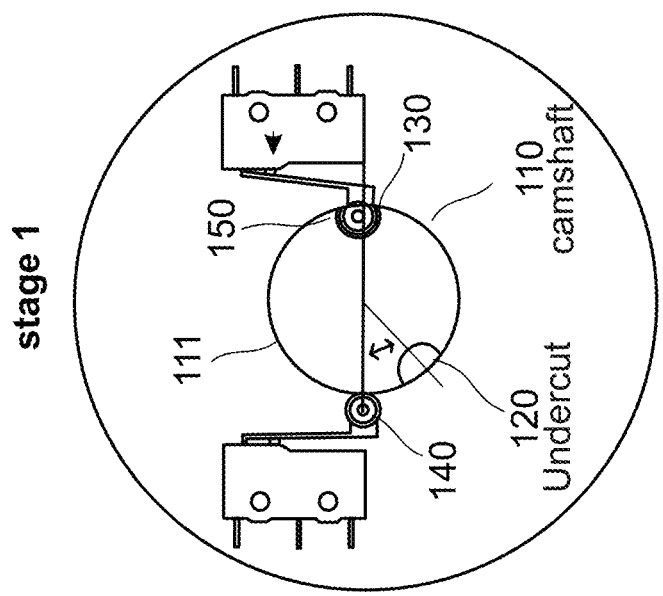

In one example, as shown in FIG. 6A, the cam shaft is provided with two undercuts 120, 130 which are sized and shaped to match the microswitches. These are located around the cam shaft such that when one microswitch 140 is pressed by the body 111 of the cam shaft, the other microswitch 130 is not pressed, due to the undercut. This provides information to the valve controller (not shown), and/or to the user as to the position of the valve. In another example, a second level of undercuts 121, 131, larger than the first, are provided that can provide additional information to control rotation of the motor assembled with the ball shaft. The operation of the two levels of microswitches will be explained in further detail with reference to FIGS. 7A-7C and 8A to 8C.

The preferred arranged has a first level of microswitches (SW1-1, SW1-2) arranged on opposite sides of the shaft at a first axial position with respect to the axial extent of the shaft. First undercuts 120,130 are formed in the cam shaft at that axial position. A second level or set of microswitches (SW2-1, SW2-2) is provided on opposite sides of the shaft, axially spaced from the first with respect to the axial extent of the shaft. Second undercuts 121, 131 are provided at a corresponding second axial position of the cam shaft.

The first set of switches, SW1-1, SW1-2, are connected to the aircraft control system via an electrical connector of the valve to indicate the actual rotational position and thus the open/closed position of the valve. This will be described with reference to FIGS. 7A-7C.

Figure 7A:
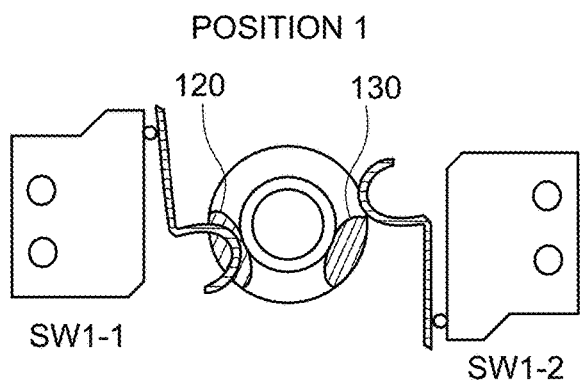
FIGS. 7A to 7C and 8A to 8C shown, in more detail, the operation of the microswitches in an embodiment according to the disclosure.

In the first position, e.g. the open position of the valve, as shown in FIG. 7A, the first switch SW1-1 engages in one of the first undercuts 120. The spacing of the first undercuts 120,130 relative to each other is such that when the first one of the undercuts 120 is aligned with the first switch SW1-1, the second of the first level undercuts, 130, is not aligned with the other first level microswitch SW1-2. The first first level switch is then actuated by moving into the undercut while the body of the cam shaft holds the second switch in the not actuated position. The controller reads that switch SW1-1 is actuated and switch SW1-2 is not actuated, which it interprets as the shaft being in the open position.

Figure 7B:
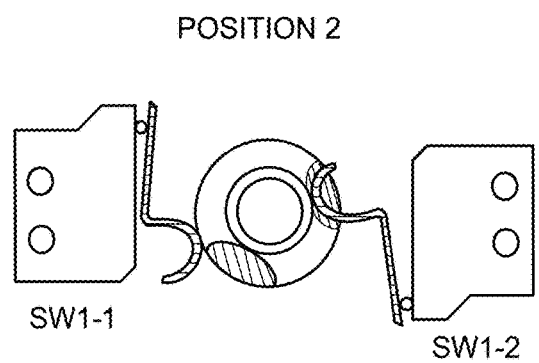

As the shaft is rotated from the open to the closed position, seen in FIG. 7B, neither switch is aligned with an undercut and so both switches are held in the deactivated position. This provides a signal to the valve control that the cam shaft, and thus ball element, is between end positions.

Figure 7C:
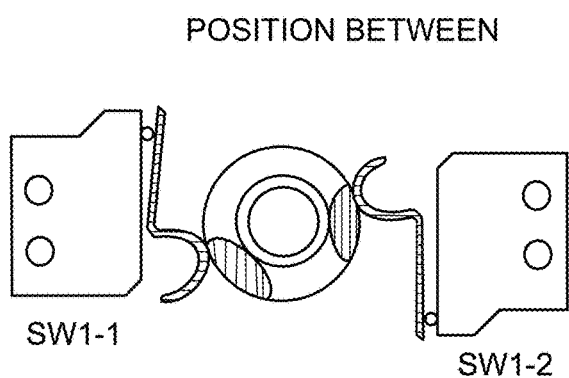

When the ball element/cam shaft reaches the second (here the closed) position, shown in FIG. 7C, the second switch SW1-2 is activated by alignment with the second first level undercut 130 whilst the first switch SW1-1 is kept in the not activated position by the cam shaft body. This indicates to the controller that the valve is in the closed position.

This has been described using the open position as the 'first position' and the closed position as the 'second position' but the operation equally applies where the open position is the second position and the closed position is the first position.

The second level of undercuts and switches provide signals to a valve internal electronic motor driver which interprets the signals using built-in logic as described below with reference to FIGS. 9A to 9D to control operation of the motor to cause rotation of the shaft to reach the desired position, and will now be described in more detail with reference to FIGS. 8A to 8C.

Figure 8A:
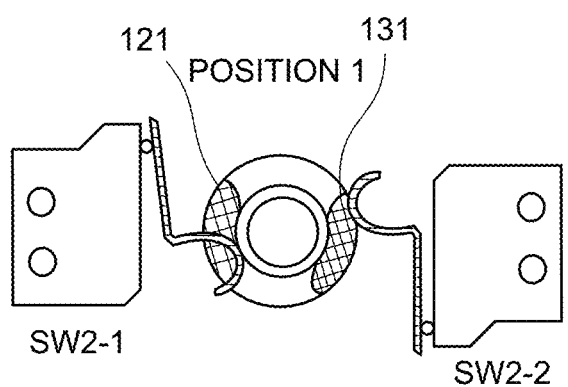

FIG. 8A shows the relationship between the switches SW2-1, SW2-2 of the second level of switches and the second level undercuts 121,131 in a first position in which the first switch SW2-1 extends into a first undercut 121 while the second switch SW2-2 is still held by the shaft body in the not actuated position.

Figure 8B:
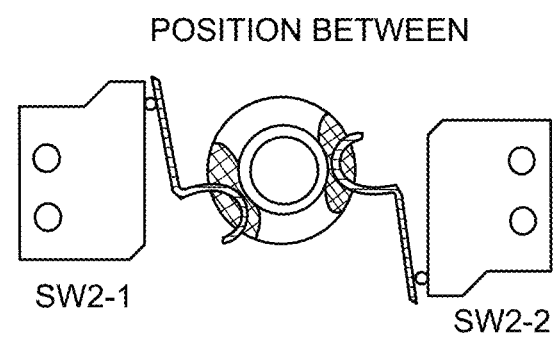

On further rotation, both switches are aligned with undercuts 121,131 so that both switches are actuated as seen in FIG. 8B.

Figure 8C:
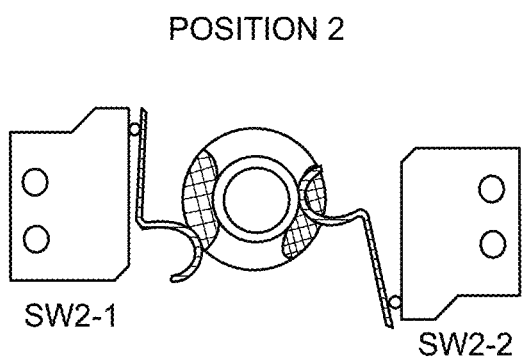

When the cam is in the second position, as seen in FIG. 8C, the second switch SW2-2 is actuated due to alignment with the second undercut 131 while the first switch SW2-1 is held in the not actuated position.

In operation, if the valve has been commanded to move to a first position (for example the open position) the motor will be controlled to rotate the shaft in accordance with signals from the second level of microswitches SW2-1, SW2-2, depending on the actual position of the shaft.

If the valve is controlled to open, or move to the first position, and the second level of switches indicates that the shaft is already at the first position (FIG. 8A), this will result in a signal sent to the motor control to stop rotation of the shaft or cut off motor power. If, on the other hand, the switches indicate that the shaft is currently in the second (e.g. closed) position (FIG. 8C), a signal will be sent to the motor controller to cause the motor to rotate the shaft in a clockwise direction to move to the first position. If the shaft is current at a position between the first and second positions (i.e. the switch states are as shown in FIG. 8B) the motor receives a command to continue its rotation.

Similarly, if the valve is commanded to take up the second (e.g. closed) position, the second level of switches will provide information as to the actual position and control the motor accordingly. If the shaft is detected as currently being in the first position, FIG. 8A, the motor will be commanded to rotate the shaft anti-clockwise towards the second position. If the shaft is already currently at the second position, the motor will be commanded to stop rotation. If the shaft is currently between the two end positions, the motor will be commanded to continue rotation.

Again, the first position has been described as the open position, and the second position as the closed position by way of example only, and the positions could be reversed. The clockwise and anti-clockwise rotation can also be reversed.

Thus, the first level of switches and undercuts provides a signal when the shaft has reached the required end positions; the second level of switches controls operation of the motor causing rotation of the shaft according to the command, depending on the current position of the shaft.

The logic control will now be described in more detail with reference to FIGS. 9A to 9D.

Figure 9A:
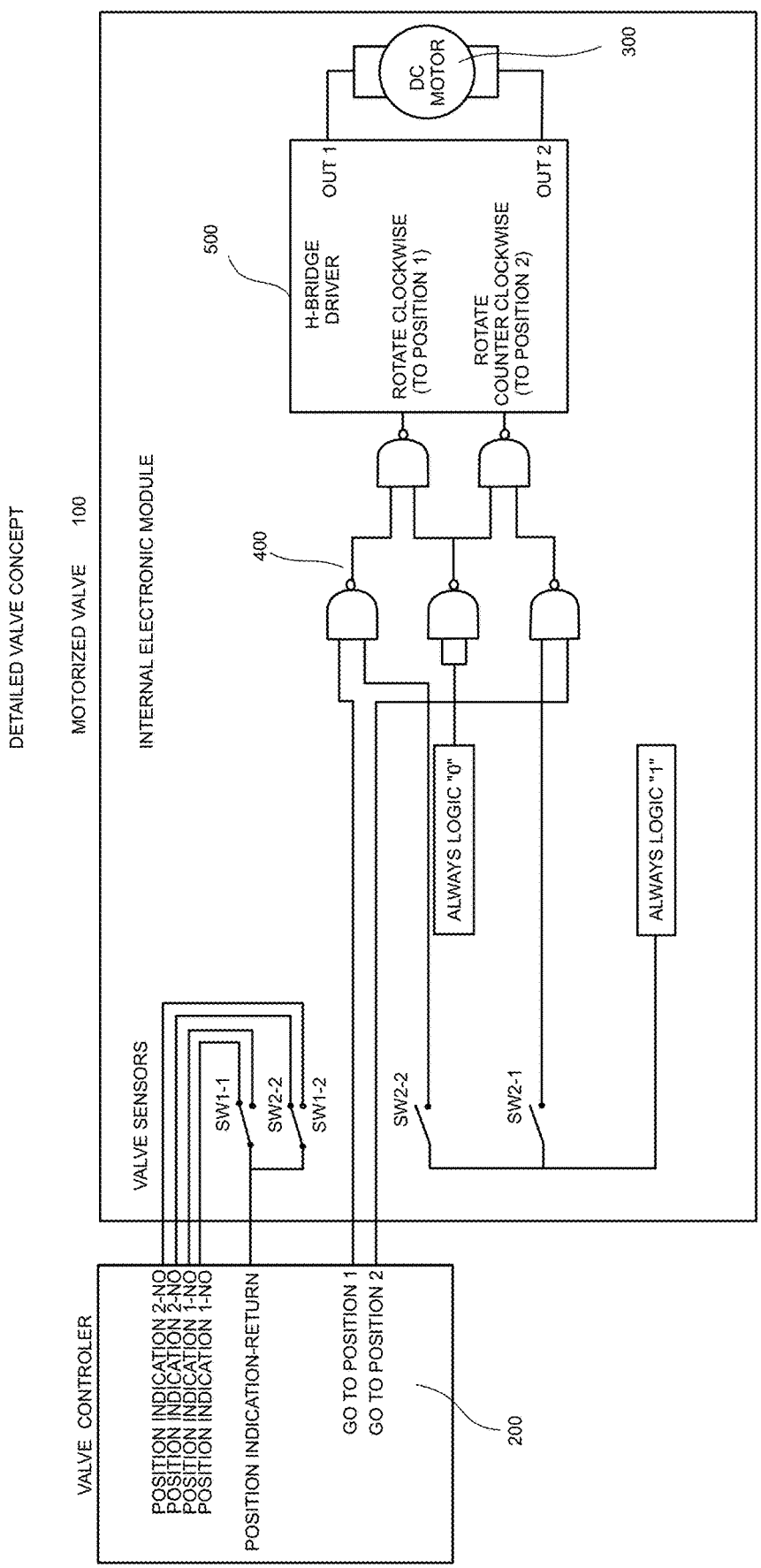
FIG. 9A shows the valve operation concept and FIGS. 9B to 9D detail the logic operation of the valve control.

FIG. 9A is a simple circuit diagram for operation of a motorized valve 100. The system includes a valve-internal electronic module including the switches SW1-1, SW1-2, SW 2-1, SW 2-2. The first set of switches, as described above, are connected to the valve controller 200. The second set of switches drove the dc motor 300 via logic circuitry 400 which controls operation of the motor driver 500.

The logic circuit comprises a number of NAND gates connected as shown.

Figure 9B:
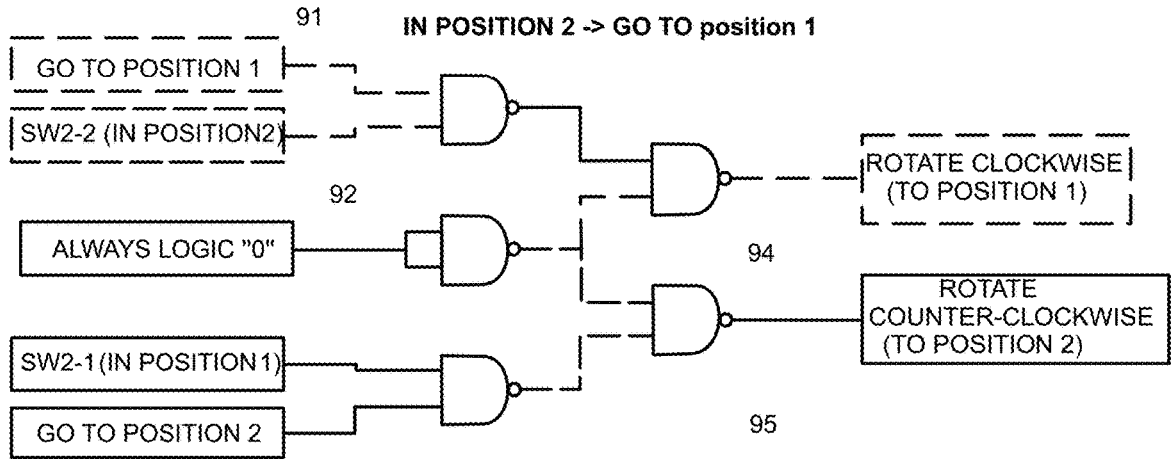
Figure 9B:
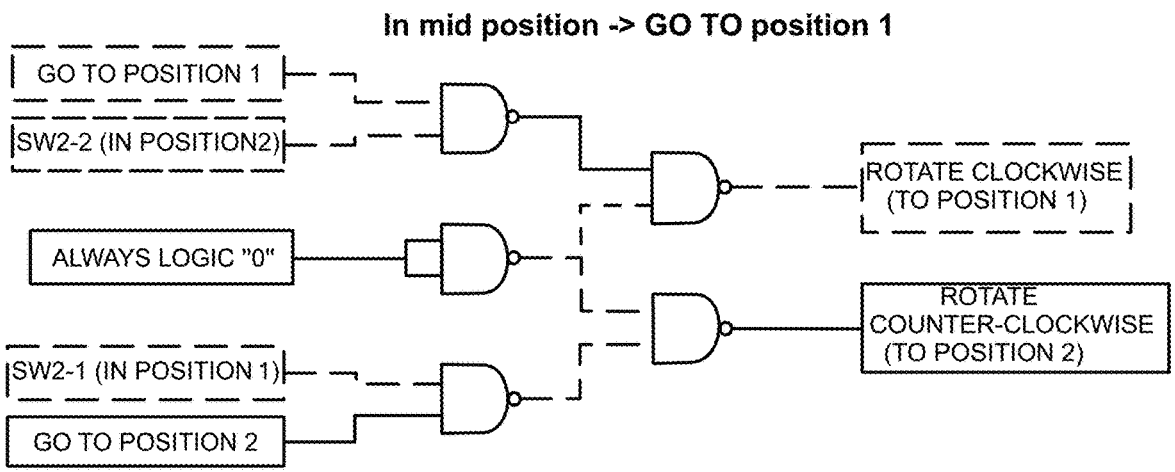
Figure 9B:
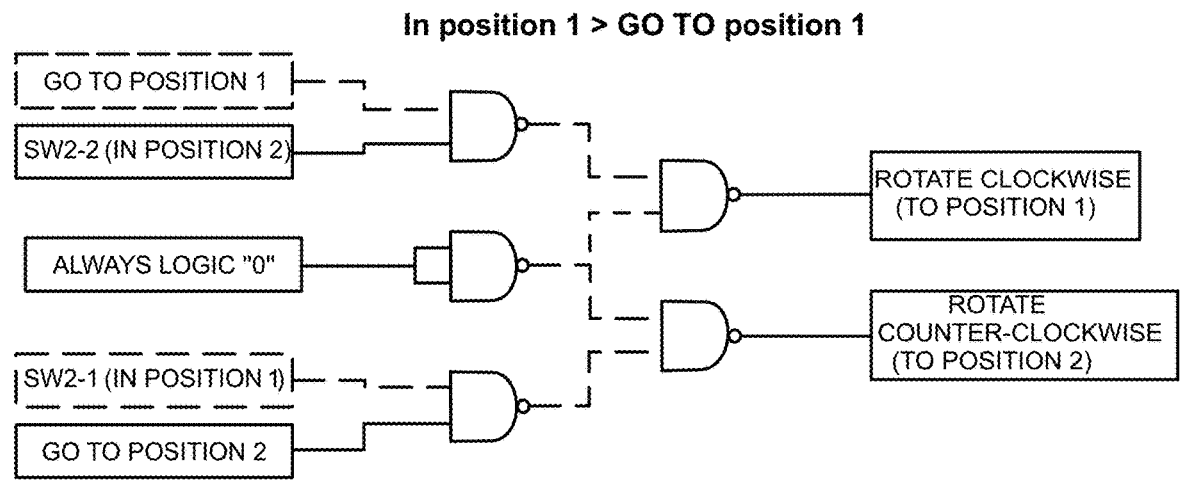
Figure 9B:
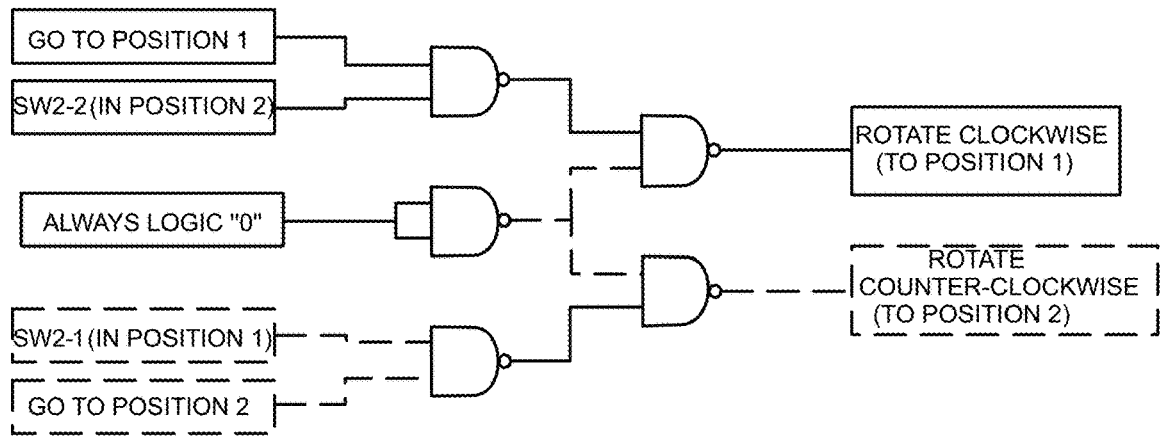
Figure 9B:
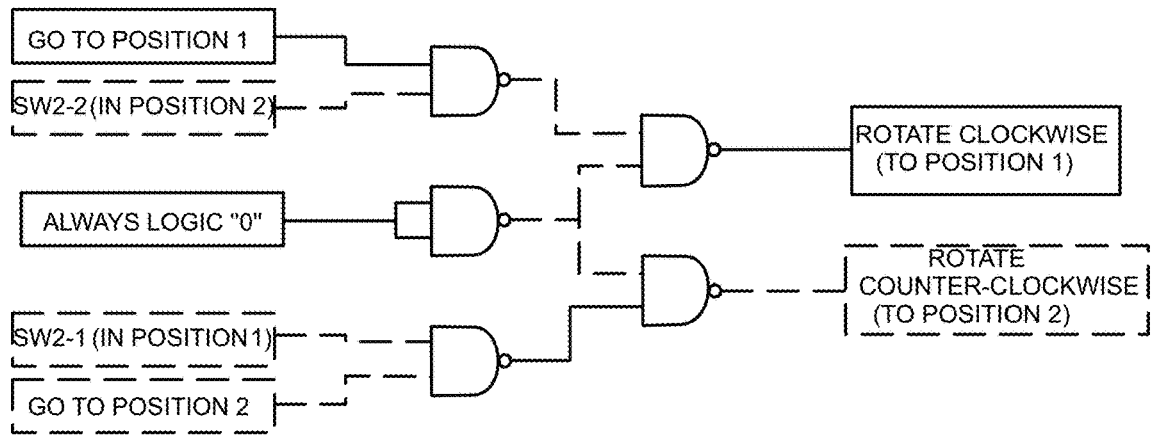
Figure 9B:
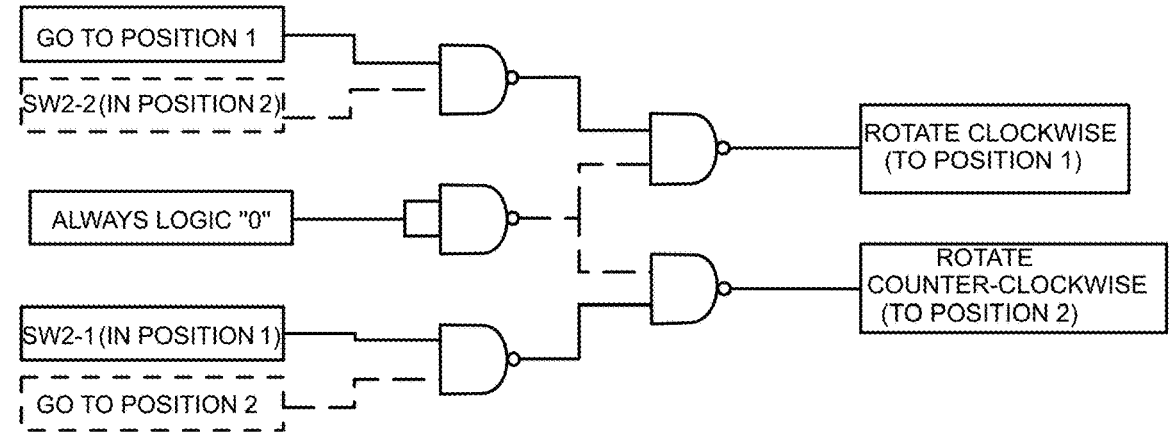

As can be seen, if, for example, the valve is in the second position and is commanded to go to the first position, the logic circuitry operates as shown in the first example of FIG. 9B. Both inputs to NAND gate 91 are true or high and so the output of that gate is low or zero. NAND gate 92 is always set to 0 at both inputs and so its output is 1. The criteria at the inputs of NAND gate 93—the valve in position 1; command to move to position 2) are, in this case both not met and so the output of that gate is high or 1. Therefore, it can be seen that in this case NAND gate 94 has one high and one low input and, therefore, its output is high, this causes the motor driver to drive the motor to rotate the valve clockwise to position 1. In this case, NAND gate 95 is off.

Following the same logic circuitry, of the switches indicate that the valve is in the mid-position and the command is to go to the first position, the output of the logic circuit is to cause clockwise rotation. If the valve is already in the first position and is commanded to go to the first position, no rotation command is provided by the logic circuit.

The same logic circuitry operates the drive the motor to rotate counterclockwise to the second position if the valve is in the first position or the mid-position and the command is to go to the second positions.

Figure 9C:
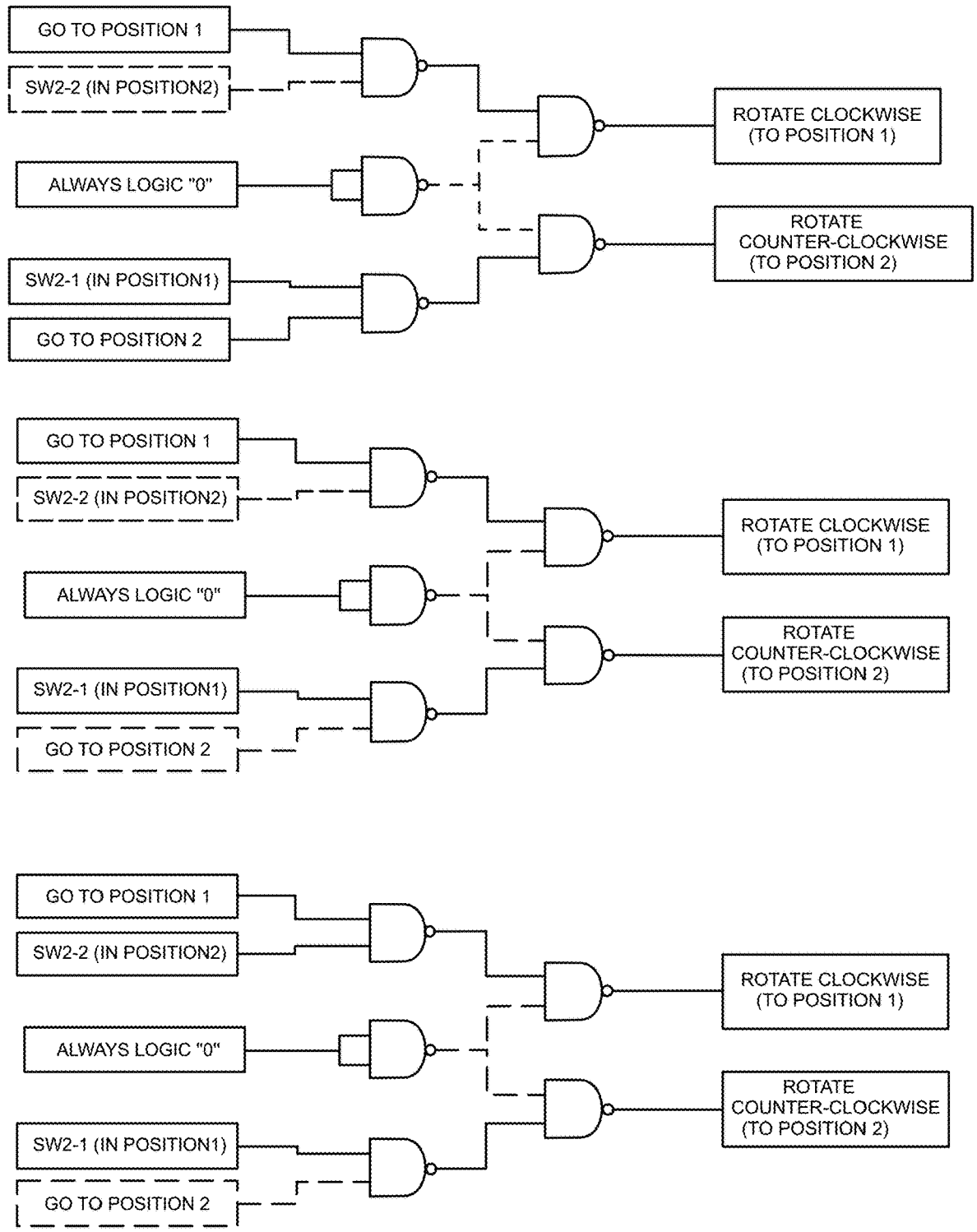
Figure 9D:
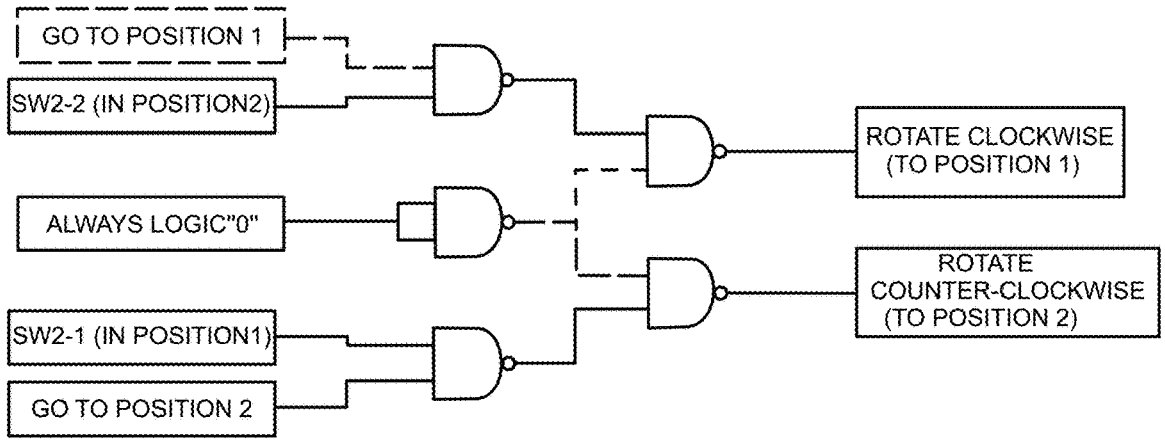
Figure 9D:
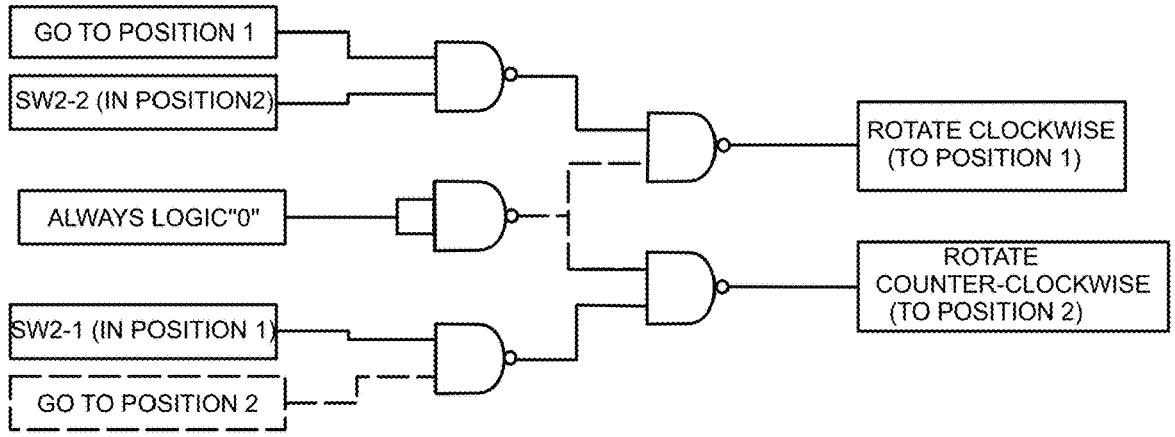

If no command is provided, as shown in the examples in the FIG. 9C, then no rotation command is provided by the logic circuitry. Similarly, if the sensors are damaged and so there is no position reading, as shown in the example in FIG. 9D then no rotation command is provided by the logic circuitry.

The actual structure of the microswitches themselves is known and will not be described further here.

Another consideration, for both the first and second example of the disclosure (i.e. for both examples having dual passages, whether the ball is rotated 90 degrees as in the first example or 45 degrees as in the second example) is that the channels need to allow sufficient flow of fluid therethrough at the pressure levels prescribed for the system. In valve controlled systems, there is usually a prescribed maximum pressure drop permitted across the valve passage. In conventional valves having only a single channel through the ball, the channel can have a sufficiently large diameter to allow sufficient fluid flow. In the valve assembly of the disclosure, however, two channels 12, 13 are provided in the ball element 11' and, if the size of the ball element is not to be substantially increased (which would be undesirable), each channel has less space and there is a limit to the diameter of the channels.

Figure 10:
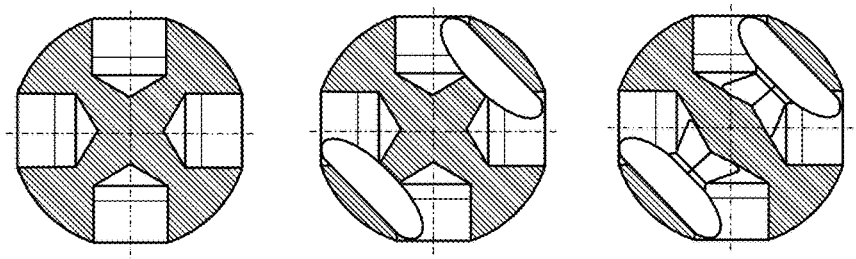
FIG. 10 shows manufacturing steps that can be used to form the channels.

The inventors have realised that it is not necessary for the channels to have a constant circular cross-section and that the cross-section along the channel can be optimised to save space whilst maintaining the desired flow or allowing greater flow. An optimal shape has been found to combine a circular cross-section at the inlet and outlet with an elliptical shape between the ends of the channel inside the ball element. This shape can best be seen in FIGS. 3 to 5. Such a shape provides the advantages mentioned above in terms of flow and a dual channel ball element but can still be manufactured easily and at relatively low cost. The structure can even be manufactured by additive manufacturing. The circular cross-section at the ends means that the channels can be aligned with existing fill and overfill lines, whereas the elliptical form between the ends means that two channels can fit in an existing ball element or one that is not much bigger than a conventional ball element. The ball shaft according to this disclosure can be easily and cost-effectively manufactured using simple and readily available tooling. The channels can be manufactured in a few steps, as shown, for example, in FIG. 10, to result in a shape such as shown in FIG. 5, and can be made using additive manufacturing. CFD calculations have shown that this shape considerably improves fluid flow for the new four port/two-channel valve design.

The dual channel, four port ball valve design of this disclosure means that both the flow from the fill line and the flow to the overfill line can be regulated using a single valve, thus providing savings in space, weight and cost. The preferred shape of the dual channels allows for sufficient flow at prescribed pressures without substantially increasing the ball valve design. The modified cam shaft of the second example of the disclosure means that the closed position of the dual channel valve avoids water waste and enables accurate position detection without the need for complex and expensive modification of the position sensing microswitch assembly.

The invention claimed is:

1. A ball valve assembly comprising:
a ball element arranged to be rotated by rotation of a shaft in engagement with the ball element, the ball element including:
first and second flow channels defined therethrough;
a first inlet port at a first end of said first flow channel;
a first outlet port at a second end of the first channel;
a second inlet port at a first end of the second flow channel; and
a second outlet port at a second end of the second channel;
wherein each of the first and the second channels defines a bend within the ball element and wherein the first inlet port, the second inlet port, the first outlet port and the second outlet port are substantially evenly spaced around the ball element;
wherein the ball element is driven by a cam shaft having a cammed external profile, the assembly further comprising switch means arranged to cooperate with the cam shaft to provide an indication of the rotational position of the cam shaft;
wherein the switch means comprises a plurality of microswitches arranged around and in proximity to the cammed external profile of the cam shaft such that the cammed external profile contacts and activates said switches at predetermined rotational positions of the shaft;
wherein the microswitches are arranged to switch in response to rotation of the cam shaft by 45 degrees;
wherein the switch means comprises two sets of microswitches, each set of microswitches comprising two microswitches arranged substantially 90 degrees apart around the circumference of the shaft, wherein the sets of microswitches are separated axially from each other with respect to the axis of the cam shaft; and
wherein the cammed external profile of the cam shaft comprises a first set of recesses arranged to cooperate with a first of the sets of microswitches, and a second set of recesses spaced axially from the first set and arranged to cooperate with a second of the sets of microswitches.

2. The ball valve assembly of claim 1, wherein the first and second channels have a cross-section that is substantially circular at the ends of the channels and is non-circular between the ends within the ball element.

3. The ball valve assembly of claim 1, wherein the shaft is driven by a motor.

4. The ball valve assembly of claim 1, wherein actuation of the switch means causes closure of a circuit to allow current to flow to provide an indication of the rotation position of the shaft and/or to control rotation of the shaft.

5. A water system comprising:
a fill line;
an overfill line; and
the ball valve assembly as claimed in claim 1
wherein the ball valve assembly is located in the fill line and the overfill line such that:
in a first rotational position of the shaft and the ball element, the first channel is aligned with and provides fluid flow along the fill line and the second channel is aligned with and provides fluid flow along the overfill line; and
in a second rotational position of the shaft and the ball element flow is interrupted along the fill line.

6. The water system of claim 5, wherein the second rotational position is a 45 degree rotation relative to the first rotational position and, in the second rotational position neither the first channel nor the second channel is aligned with either of the fill line and the overfill line and now flow is enabled through the first or the second flow channel.

7. The water system of claim 5, further comprising a water supply and a tank, the fill line providing a fluid flow channel from the water supply to the tank via the ball valve assembly when the ball element is in the first position, the overfill line allowing fluid to flow from the tank via the ball valve assembly when the ball element is in the first position.

8. A method of operating the ball valve assembly as claimed in claim 1, the method comprising:
rotating the shaft to rotate the ball element to a first position to align the first flow channel with a fluid fill line to allow fluid to flow along the fill line via the first flow channel and to align the second flow channel with an overfill line to allow fluid to flow along the overfill line via the second channel; and
rotating the shaft by a quarter turn so that the first and second flow channels are not aligned with the fill and/or overfill lines and fluid flow is prevented through the flow channels.

* * * * *